United States Patent
Saidi

(10) Patent No.: US 8,778,110 B2
(45) Date of Patent: Jul. 15, 2014

(54) METHOD OF MANUFACTURING A COMPOSITE TEXTILE

(75) Inventor: Mohamed-Ali Saidi, Puteaux (FR)

(73) Assignee: Lear Corporation, Southfield, MI (US)

( * ) Notice: Subject to any disclaimer, the term of this patent is extended or adjusted under 35 U.S.C. 154(b) by 772 days.

(21) Appl. No.: 12/524,240

(22) PCT Filed: Mar. 4, 2008

(86) PCT No.: PCT/US2008/055759
§ 371 (c)(1), (2), (4) Date: Jul. 23, 2009

(87) PCT Pub. No.: WO2008/109583
PCT Pub. Date: Sep. 12, 2008

(65) Prior Publication Data
US 2010/0078116 A1   Apr. 1, 2010

(30) Foreign Application Priority Data
Mar. 8, 2007  (FR) ..................... 07 56915

(51) Int. Cl.
*B32B 37/00*  (2006.01)
*B32B 5/26*   (2006.01)
*B32B 37/12*  (2006.01)
*B29C 65/10*  (2006.01)

(52) U.S. Cl.
CPC . *B32B 5/26* (2013.01); *B32B 37/12* (2013.01); *B29C 65/10* (2013.01)
USPC ........................................... 156/73.1; 156/82

(58) Field of Classification Search
USPC ............... 156/73.1, 82, 305, 320, 324, 324.4, 156/497, 499, 555, 580.1, 580.2, 582, 583.1
See application file for complete search history.

(56) References Cited

U.S. PATENT DOCUMENTS

| | | |
|---|---|---|
| 3,654,019 A | 4/1972 | Cusick |
| 3,748,217 A | 7/1973 | May et al. |
| 4,097,943 A | 7/1978 | O'Connell |
| 4,503,114 A | 3/1985 | Cohen |
| 4,996,102 A | 2/1991 | Kyutoku et al. |
| 5,268,222 A | 12/1993 | Honeycutt |
| 5,693,420 A | 12/1997 | Terada et al. |
| 5,866,488 A | 2/1999 | Terada et al. |
| 6,156,679 A | 12/2000 | Takaoka et al. |
| 6,271,155 B1 | 8/2001 | Noma et al. |

(Continued)

FOREIGN PATENT DOCUMENTS

| | | |
|---|---|---|
| DE | 8702810 U1 | 6/1987 |
| DE | 19604726 A1 | 8/1997 |

(Continued)

OTHER PUBLICATIONS

German Patent & Trademark Office, Office Action for the corresponding German Patent Application No. 11 2008 000 633.4 mailed Jan. 14, 2011.

(Continued)

*Primary Examiner* — James Sells
(74) *Attorney, Agent, or Firm* — Brooks Kushman P.C.

(57) ABSTRACT

A method of manufacturing a composite textile having a textile face layer and a non-woven backing layer. The textile face layer may be bonded to the non-woven backing layer using various techniques such as by providing an adhesive or adhesive material associated with at least one of the layers.

17 Claims, 2 Drawing Sheets

(56) References Cited

U.S. PATENT DOCUMENTS

| | | |
|---|---|---|
| 6,309,506 B1 | 10/2001 | Kannegiesser et al. |
| 6,425,969 B1 | 7/2002 | van den Akker |
| 6,502,289 B1 | 1/2003 | Kane et al. |
| 6,528,437 B1 | 3/2003 | Hepfinger et al. |
| 6,893,522 B1 | 5/2005 | Crainic |
| 6,908,528 B2 | 6/2005 | Hayes |
| 6,919,117 B1 | 7/2005 | Kane et al. |
| 6,926,055 B1 | 8/2005 | Colson et al. |
| 2003/0027474 A1 | 2/2003 | Hayes |
| 2003/0087572 A1 | 5/2003 | Balthes et al. |
| 2003/0157853 A1 | 8/2003 | Huber |
| 2004/0053551 A1 | 3/2004 | Carlson et al. |
| 2004/0197522 A1 | 10/2004 | Reisdorf et al. |
| 2005/0064777 A1 | 3/2005 | Stewart |
| 2005/0148268 A1 | 7/2005 | Tai |
| 2005/0158539 A1 | 7/2005 | Murphy et al. |
| 2005/0225005 A1 | 10/2005 | Marchbanks et al. |

FOREIGN PATENT DOCUMENTS

| | | |
|---|---|---|
| DE | 19739042 A1 | 3/1999 |
| DE | 9321570 U1 | 10/1999 |
| EP | 0901901 A2 | 3/1999 |
| GB | 2052380 A1 | 1/1981 |
| JP | 2000272041 A | 10/2000 |

OTHER PUBLICATIONS

German Patent and Trademark Office, Office Action for the corresponding German Patent Application No. 11 2008 000 633.4 mailed Mar. 20, 2014.

METHOD OF MANUFACTURING A COMPOSITE TEXTILE

BACKGROUND OF THE INVENTION

Field of the Invention

The present invention relates to composite textile fabric and a method of manufacture.

SUMMARY OF THE INVENTION

In at least one embodiment, a method of manufacturing a composite textile is provided. The method may include providing a textile face layer and a non-woven backing layer. The textile face layer may be attached to the non-woven backing layer, such as with an adhesive provided to at least one of the layers before or after the layers are positioned relative to each other.

DETAILED DESCRIPTION

Figure 1:
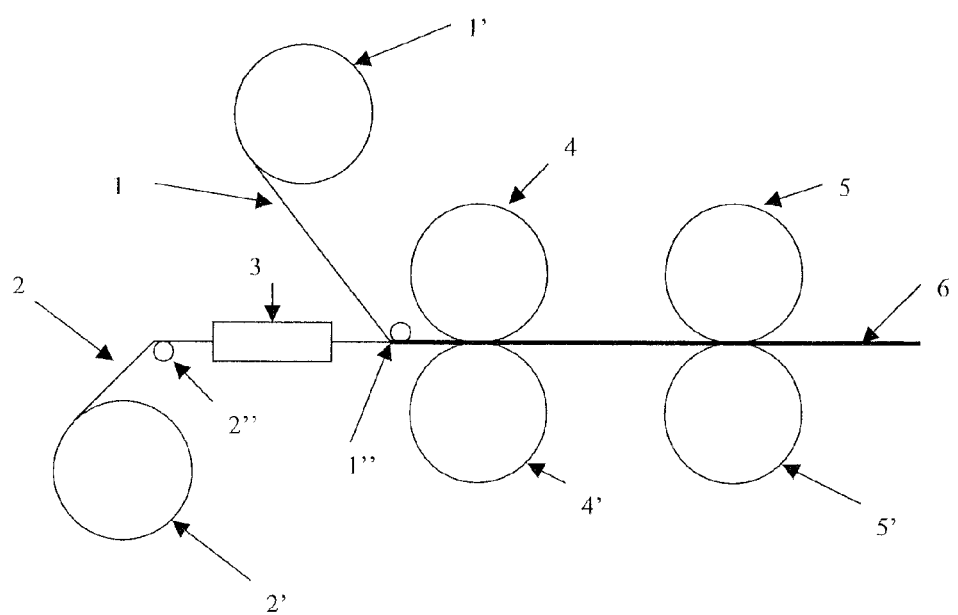
FIGS. 1 and 2 illustrate two possible implementations of the manufacturing process of the composite textile of the invention.

The purpose of this invention is a composite textile, characterized by the fact that it is made of two layers adhered to each other, the first one being a textile face layer and the second a non-woven material backing layer.

The textile face layer may be chosen from among woven materials, such as knitted textiles like rectilinear, Raschel and circular knits, braided textiles, and velvets, and may be made from natural, artificial, or synthetic fibers.

The non-woven backing layer may be chosen from among non-woven materials made by a dry, extrusion, or wet process, or any combination of these processes. The non-woven materials may either be coated or not and may be made of natural, artificial, or synthetic fibers.

The non-woven backing layer may be a non-woven material or a non-woven sheet that is fused by thermal fusion, such as fiber thermofusion, powder sprinkling, ultrasound, and chemical fusion, such as impregnation, spraying, pressing, or any combination of these fusing techniques.

The link between the two layers of the composite textile may be made by flame bonding lamination on at least one of the faces of the two layers, and/or by gluing the two layers with an adhesive material that may either be applied in advance or not, by powder sprinkling, by spraying, by impregnation, by a gravure coater, by pressure, or any combination of these techniques. The adhesive material may be provided on at least one of the two faces of the layers. The adhesive material may be previously contained in at least one of the two layers, and which has been introduced by impregnation, powder sprinkling, spraying, gravure coater, pressure, or by any combination of these techniques and/or which has penetrated the make up of at least part of the fibers of one layer, or both. The adhesive may be a double faced adhesive film, which may either be introduced in advance or not, between the layers, a thermofusible film, which may be either introduced in advance or not between the layers; or with a combination of at least two of these flame bonding lamination and/or gluing techniques.

The back layer may contain an adhesive material suitable for adhering the composite textile to its final support (such as padding, wood, etc.). The adhesive material may be introduced into the back layer by impregnation, powder sprinkling, spraying, gravure coater, pressure, or by any combination of these techniques and/or may penetrate the make up of at least part of the fibers of one or both layers.

At least part of the back layer may be coated on its free face with a thin film of adhesive suitable for ensuring that the composite textile will adhere to its final support, such as padding, wood, etc.

The composite textile may be made by providing the face layer and the backing layer on separate rolls. The layers may be unrolled and assembled continuously from their respective rolls and bonded in any of the following ways:

(a) After having performed the flame bonding lamination of at least one of the faces of the layers; or (b) By hot or cold gluing the layers after having applied by spraying, impregnation, pressure, sprinkling, gravure coater, or by any combination of these techniques, a glue or liquid or solid adhesive material on at least one of the faces of the layers;

(c) By bonding the layers of which at least one contains an adhesive material;

(d) By bonding the layers by thermofusion, with at least one part of the fibers of the layers being thermofusible;

(e) By bonding the layers by ultrasound, the fibers of the layers being chosen for their ability to be fused by ultrasound;

(f) By the introduction of a thermofusible film between the layers and bonding them by thermofusion;

(g) By the introduction of a double faced adhesive film between the layers and assembling by bonding using a combination of the above mentioned techniques (a to f);

Hot or cold bonding is usually performed through the application of force, often by a simple press or by passing through several cylinders or belts, to assure cohesion between the layers, heat bonding, or by thermofusion by passing through a furnace or cylinders or belts which are either heated or not.

The composite fabric thus formed may undergo post-impregnation or the deposition of an adhesive material on the free face of the back layer, which is afterwards sent to a cutting station, such as a manual or automatic cutting machine by means of a blade or press.

This invention also describes the use of this composite textile as described above, for covering and fabrication of vehicle seating (seats, seat backs, head rests, arm rests, etc.), door backing, vehicle roof panels and interiors, as well as upholstery fabric.

In accordance with the process illustrated in FIG. 1, a strip of textile facing 1 and a strip of non-woven backing 2 are unrolled continuously from two rolls 1', 2', respectively.

The non-woven backing 2 passes over a small guide roller 2". A liquid or solid adhesive material applied in advance by technique similar to that described above on the non-woven backing 2, is activated in a device 3 such as a textile stenter machine, furnace, heated belt, radiant panels, electric heating resistors, through which the non-woven backing 2 passes.

The textile facing strip 1 passes over a small guide roller 1" before it is applied to the non-woven backing 2 with the adhesive material that was activated in the device 3.

The textile facing strip 1 and the non-woven backing 2 support each other through the passage between two pressure rollers 4, 4'.

This double strip is then supported while passing through two rollers 5, 5'.

The resulting composite textile 6 may then be rolled onto a fabric roll for storage.

As a variation, the adhesive material may be deposited on the textile facing strip 1 or even at the same time on the textile facing strip 1 and on the non-woven backing 2. As another variation, at least one portion of the fibers of either layer or both may be thermofusible.

Also an adhesive material may be pre-deposited on the strip as it moves, before entering into the activation device 3.

Figure 2:
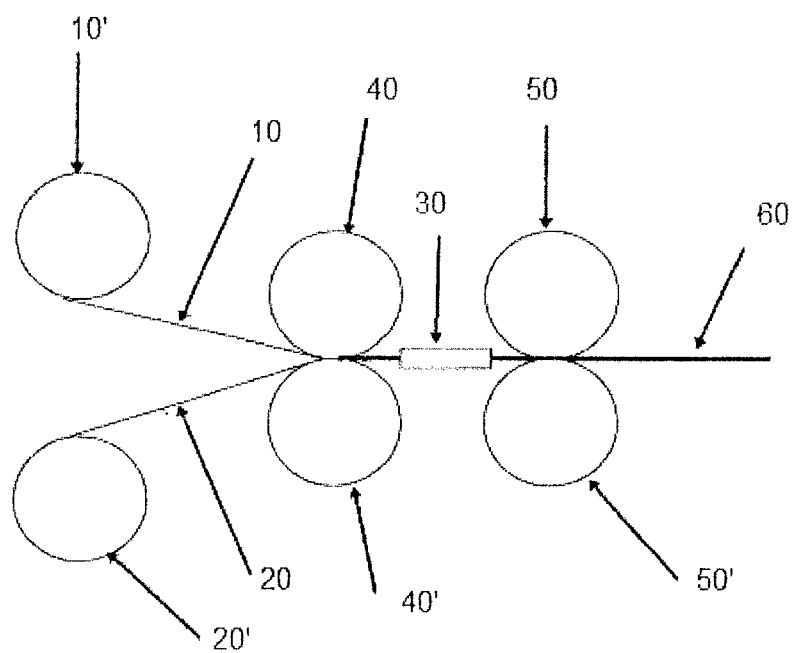

Referring to FIG. 2, a strip of textile facing 10 and a strip of non-woven backing 20 are unrolled from two rolls, respectively 10', 20'.

Either of these strips or both may contain(s) an adhesive material which was previously applied by a technique such as that mentioned above. As a variation, at least one portion of the fibers of either layer or both may be thermofusible.

The two strips 10, 20 may support each other through the passage between two guide rollers 40 and 40'.

The activation operation for the adhesive material is performed by passing it through an activation device 30, which may be of the same type as device 3 in FIG. 1. As a variation, the adhesive material deposited on the strip 10 may be activated between rollers 10' and 40, and/or an adhesive material may be deposited on strip 20 between rollers 20' and 40'.

The double strip leaving the device 30 is then supported while passing through two pressure rollers 50 and 50'.

The resulting composite textile 60 may then be rolled onto a fabric roll for storage.

In at least one embodiment, the composite textile may resist kinking or breakage after storage. Moreover, the composite textile may be provided without a foam layer that may increase the risk of wrinkling, may increase cost or weight, may complicate packaging and transport, and may make recycling difficult. Moreover, the inventor has discovered that replacing the foam layer and if necessary, the locknit with a non-woven back material makes it possible to solve the group of problems posed with the additional advantage in comparison to three layer composites to only cut two layers, thus reducing the cutting time (and possibly cut more textile pads at the same time).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of manufacturing a composite textile, comprising:
   unrolling a textile face layer from a first roll;
   unrolling a non-woven backing layer from a second roll;
   providing an adhesive to the non-woven backing layer;
   activating the adhesive in a device;
   positioning the textile face layer in contact with the adhesive to bond the textile face layer to the non-woven backing layer after activating the adhesive in the device and before passing the textile face layer and the non-woven backing layer between a first pair of rollers; and
   passing the textile face layer and non-woven backing layer between the first pair of rollers to squeeze the textile face layer and non-woven backing layer together to create the composite textile.

2. The method of claim 1 wherein the textile face layer is a woven material.

3. The method of claim 1 further comprising passing the composite textile between a second pair of rollers and rolling the composite textile onto a third roll.

4. The method of claim 1 wherein the textile face layer is positioned in contact with the non-woven backing layer at a single guide roller.

5. The method of claim 1 wherein the device includes a heat source and the adhesive is activated by heat from the heat source.

6. The method of claim 5 wherein the device includes a flame for flame bonding the non-woven backing layer to the textile face layer.

7. The method of claim 1 wherein the device ultrasonically bonds the non-woven backing layer to the textile face layer.

8. The method of claim 1 wherein the adhesive is provided as a double sided adhesive film.

9. The method of claim 1 wherein the adhesive is applied to the non-woven backing layer while the non-woven material layer is in motion.

10. The method of claim 1 wherein the adhesive is applied to the textile face layer while the textile face layer is in motion.

11. A method of manufacturing a composite textile, comprising:
    unrolling a woven textile face layer from a first roll and unrolling a single non-woven backing layer from a second roll, wherein the non-woven backing layer includes an adhesive material before being unrolled;
    passing only the textile face layer and the non-woven backing layer between a first pair of rollers such that the textile face layer contacts the non-woven backing layer;
    activating the adhesive material to bond the textile face layer and the non-woven backing layer together after passing the textile face layer and the non-woven backing layer between the first pair of rollers; and
    passing the textile face layer and non-woven backing layer between a second pair of rollers to squeeze the textile face layer and non-woven backing layer together.

12. The method of claim 11 wherein the textile face layer is a woven material.

13. The method of claim 11 wherein the adhesive material is activated by a device located between the first and second pair of rollers that provides heat.

14. The method of claim 11 wherein the adhesive material is activated by pressure applied by the second pair of rollers.

15. The method of claim 14 further comprising rolling the composite textile onto a third roll after exiting the second pair of rollers.

16. The method of claim 11 wherein adhesive material is activated by a device located between the first and second pair of rollers that ultrasonically bonds the non-woven backing layer to the textile face layer.

17. The method of claim 11 wherein the adhesive material is a double sided adhesive film.

* * * * *